July 4, 1950  A. G. DEAN  2,514,034

MEANS FOR SUPPORTING RAILWAY CARS ON THEIR TRUCKS

Filed Oct. 15, 1947

INVENTOR
Albert G. Dean
BY *Maurice A. Crews*
ATTORNEY

Patented July 4, 1950

2,514,034

UNITED STATES PATENT OFFICE 2,514,034

MEANS FOR SUPPORTING RAILWAY CARS ON THEIR TRUCKS

Albert G. Dean, Narberth, Pa., assignor to The Budd Company, Philadelphia, Pa., a corporation of Pennsylvania Application October 15, 1947, Serial No. 779,966

5 Claims. (Cl. 105—199)

The invention relates to a center plate construction for supporting railway cars on their trucks.

Among the objects of the invention is the improvement of the riding qualities of a truck-supported railway car and, more particularly, the avoidance of nosing and shimmying, that is, vibration of the truck about its axis of rotation. It is known that during the normal course of wear, the wheels of railway trucks tend to assume a contour which will render the truck liable to nosing and shimmying, and that at high speeds both the wear and the tendency to shimmy are increased.

Another object of the invention is the simplification of the structure and of the maintenance of the center plate supports.

Briefly expressed, the invention consists in the use of a disc between the center plate portion on the truck and the mating center plate portion on the car body, which disc has at least one of its surfaces formed of friction lining material similar to the material used in automobile brakes, and which disc, furthermore, has damping qualities and a moderate degree of resilience to prevent the transmission of vibrations from the truck to the body and to equalize the pressure when body and truck tilt relative to each other.

With the new center plate, oscillations of the truck about the center plate axis are effectively subdued, whereas the relative rotation of body and truck in going through curves is not unduly hampered.

The invention also prevents vibrations from being transmitted from the truck to the body, as indicated before. Finally, the new center plate does not require any lubrication. Indeed, it is a feature of the invention that the center plate is used without lubrication.

The new center plate and its use means a radical departure from the center plates hitherto used, and it means a departure from the trend in which, up to now, the development of center plates was moving.

Up to the present time, every effort was made to keep the friction at the center plate down to a minimum. For a long time, this was achieved by well lubricating the center plate which, for this purpose, was often provided with lubricant-retaining projections and with a fabric insert for storing the lubricant and distributing it over the entire supporting surface. This still left, of course, a small amount of friction to overcome and, if the center plate was not properly lubricated, the friction between the dry surfaces coupled with rust, grit and other dirt, could rise to unpredictable heights, thereby seriously hampering the operation of the car.

In more recent years, friction was eliminated practially altogether and the necessity for lubrication avoided by the use of rubber plates between the mating center plate portions of the truck and the car.

The invention retains all the actual advantages of the rubber inserts but does away with a characteristic of such rubber plates which was presumed to be an advantage but which applicant discovered to be a drawback promoting shimmying.

Instead of eliminating friction, the invention contemplates a center plate giving a well defined and fairly constant amount of friction.

The objects and features of the invention as well as the differences of the invention over the prior art constructions will be more easily and fully understood from the following description of the embodiment illustrated in the attached drawing.

Figure 1:
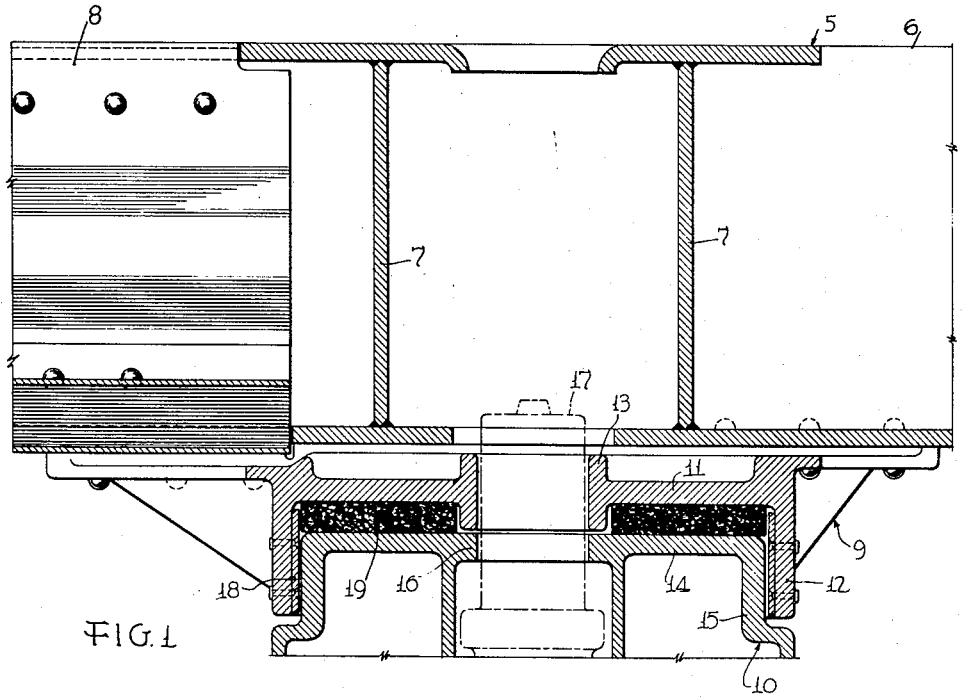
Figure 1 is a fragmentary section through adjoining parts of a railway car body underframe and of one of the supporting trucks with mating center plates and with an insert according to the invention.
Figure 3:
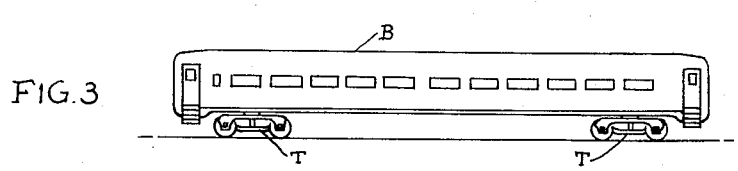
Figure 3 is a small-scale diagrammatic side elevation of a railway car.
Figure 2:
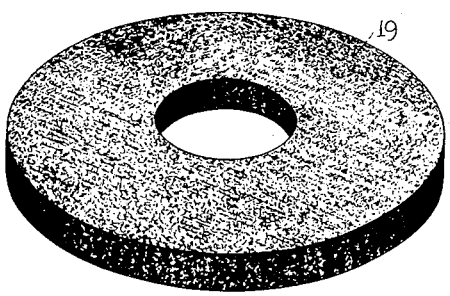
Figure 2 is a perspective view of the insert.

The underframe weldment 5 of the body B has a center sill portion 6 and body bolster webs 7. The center sill portion 6 is secured to the main center sill 8. At the intersection of the center sill portions 6 and 8 with the bolster webs 7, a center plate casting or forging 9 is secured to the aforesaid members, as by rivets. A mating center plate portion 10 is provided on the bolster of the supporting truck T. The body center plate has a horizontal annular portion 11, a downwardly projecting flange 12 and a central reinforcement 13. The truck center plate 10 has a horizontal annular portion 14, a downwardly extending cylindrical portion 15 and a central opening at 16. 17 indicates the customary center pin extending through the openings at 13 and 16. Secured to the inside of the cylindrical flange 12 is a wear lining 18.

The construction so far described is known and customary. The invention resides in the nature and the use of the lining plate 19 interposed between the horizontal portions 11 and 14 of the center plates. As indicated in the preamble of the specification, it was known and even customary to put a lining between the body and truck center plates but those linings were of such a nature and used in such a way as to reduce the friction to a minimum either between the interfaces or by practically frictionless deformation of the lining upon relative rotation of body and truck. In this connection, it should be noted and well understood that the drawing cannot convey a picture of the differences between the old and the new center plate constructions and their use, but that the differences can only be explained in and understood from the verbal description.

The plate 19, according to the invention, has at least one, or both, of its radial surfaces, that is the surfaces contacting the center plate portions 11 and 14, in the nature of friction material or brake lining such as commonly used in the brakes of modern automobiles. Moreover, the entire body of the plate 19 has, according to the invention, a certain amount of softness or damping characteristics and a moderate degree of resilience which, in combination with the substantial thickness of the plate, form an effective bar against the transmission of vibrations and noises from the truck to the body but which, on the other hand, do not permit any substantial angular relative movement about center pin 17 of body and truck without relative movement of the interfaces between the plate 19 and at least one of the center plate portions 11 and 14, respectively. Consequently, any angular movement between body and truck requires that the substantial friction incident to the nature of the surfaces of the plate 19 is overcome and that no oscillatory vibrations or the objectionable shimmy are permitted to build up.

It will easily be understood that for the desired effect, frictional engagement between only one of the surfaces of the insert plate 19 and the juxtaposed center plate member is required, whereas the plate may be held immovably with respect to the other center plate. None of the juxtaposed surfaces must, of course, be allowed to be more or less frictionless.

In the illustrated embodiment, it is assumed that the plate 19 consists of a thick matting of woven threads of the mineral asbestos reinforced by brass wires and pressed into a solid body with fillers, such as rubber, and a binder, such as resin. The composition and the construction of this plate are substantially the same as are well known for brake linings of automobiles except for the great thickness. Expressed in somewhat different words, the material is basically a plate-shaped, heavy-duty brake lining. It is made by interweaving threads of asbestos, cotton fiber, and brass wire and by impregnating the fabric with a synthetic rubber reclaim. The whole assembly is cured into one homogeneous non-fragile, grease- and water-resistant body by heat and high pressure.

So as to achieve the object of the invention, it is essential that the new lining is used in dry condition, that is, without lubricant. When used in this condition, the desired dampening effect is fully obtained. On the other hand, no danger is caused if some lubricant should enter the center plate construction, as such would only diminish the dampening effect but would not interfere with the safe operation of the car.

The new lining greatly prolongs the useful life of the wheels before the wear of the latter leads to shimmy. Indeed, when shimmy finally occurs, the wheels are anyhow in the Association of American Railroads' condemning limits.

Good results were achieved with a lining plate 19 having approximately the following properties. The plate 19 has the modulus of elasticity of the material, which is a measure of the resiliency, of approximately 80,000 to 100,000 pounds per square inch in the region in which it is used. The material exhibits a variable modulus as the loading changes, so the region under a compression stress of approximately 300 pounds per square inch was chosen, somewhat arbitrarily, as corresponding to the condition encountered in the truck design to which the plate was applied. As comparative figures, it can be pointed out that steel exhibits a modulus of approximately 30,000,000 pounds per square inch, brass a modulus of about 15,000,000 pounds per square inch, and aluminum a modulus of approximately 10,000,000 pounds per square inch under equivalent loading conditions.

The dry coefficient of friction of the material of the lining plate against steel is approximately 0.42.

It should be understood that the specific composition or structure of the lining plate is not essential and that many different compositions, all having the same general properties outlined above, as now supplied for brake linings by different manufacturers may equally well be used. Furthermore, it is conceivable that new linings having the above-outlined properties will be developed in the future.

It should be understood that the above-outlined characteristics of a center plate lining according to the invention may be subject to wide variations without impairing the desired result. Such variations may also be predicated by the specific characteristics of the vehicles in which the lining is to be used or by the conditions under which the vehicle is to be run.

Recapitulating, the outstanding properties of the lining plate which are essential for achievement of the aims of the invention are:

1. A moderate degree of resilience in vertical direction to insure proper distribution of the load from the body to the truck. The magnitude of the resilience is limited to the amount necessary to maintain proper relationship of center plate to side bearing support; the side bearings should remain steadying elements only.
2. Good wearing properties.
3. A fairly constant coefficient of friction.
4. A coefficient of friction which is well above that of a lubricated surface.
5. A resilience of the lining plate in horizontal or circumferential direction which is so small as not to allow substantial torsional deformation of the lining upon angular rotative movement of truck and body so as to insure relative movement of the lining and at least one of the center plates in overcoming the aforesaid friction.
6. Vibration damping characteristics to prevent transmission of noise and other vibrations.

With these essential features of the invention in mind, protection is claimed for the invention as covered by the language and the spirit of the attached claims.

What is claimed is:

1. In a vehicle, a wheeled truck, a vehicle body, mating center plates on truck and body having surfaces facing each other and arranged for transmitting at least a large part of the weight of said body to said truck, and a liner being interposed between said surfaces of the center plates, said liner having at least one of its surfaces, contacting said center plate surfaces, of friction material of the kind used for automotive brake and clutch linings, said liner being non-fragile, being stiff in circumferential direction as to prevent rotation of body and truck by mere internal deformation of the liner, said liner being held in a condition in which the specific dry friction of said friction material of the liner is maintained, said liner and center plates being held together so as to permit relative rotation of body and truck only by relative rotation of said friction material and the respective contacting center plate in overcoming the dry friction thereby subduing shimmy of the truck about the axis of the center plates, such liner having furthermore damping characteristics and being yieldable in the axial direction of the center plate for blocking the transmission of vibrations between body and truck and for distributing the load over a large part of the area of the liner.

2. In a vehicle, a wheeled truck, a vehicle body, mating center plates on truck and body having surfaces facing each other and intersecting the axis of the center plates for transmission of at least a large part of the weight of said body to said truck, and a liner of grease- and water-resistant friction material of the type used on automotive brakes and clutches, being interposed without lubricant between said surfaces of the center plates, said liner being stiff in circumferential direction to permit relative rotation of body and truck only in overcoming the friction between said liner and said center plates, such friction suppressing shimmy of the truck about the axis of the center plates.

3. In a center plate structure between a vehicle body and a truck supporting it, a generally horizontal supporting surface formed on a horizontally immovable part of the truck and an opposite mating supporting surface formed on a horizontally immovable part of the body, a horizontal lining plate placed between said surfaces of non-fragile, largely non-metallic material having a limited yieldability in vertical direction between said two surfaces for transmitting the load, said plate having at least one of its surfaces, engaging said supporting surfaces, of friction material said friction material being of the type used for brake and clutch linings, said friction material being kept in a state in which its dry coefficient of friction is maintained, said plate being circumferentially stiff and being held between said supporting surfaces so as to permit relative rotation of said supporting surfaces only upon relative rotation of said friction material and the respective supporting surface contacting it and in overcoming the friction, and the thickness of said plate being such as to render it in combination with its said limited yieldability an absorber of vibrations reaching one of said surfaces.

4. A lining for center plates of railway cars in the form of a circular disc, said disc having a size and shape fitting between center plates, said disc having at least one of its radial surfaces of friction material of the type used on automotive brakes and clutches, said disc being practically rigid in circumferential direction, said disc being vibration-damping, non-fragile and moderately yieldable in transverse direction and sufficiently thick as to suppress vibrations and shimmy and to distribute the load when it is interposed between mating center plates, and said disc is held so that rotation between the metal center plates can take place only in overcoming the friction between the friction material and the center plate which it contacts, and is kept in a state in which the specific dry friction of said material and the metal of the center plate is maintained.

5. In a vehicle, a wheeled truck, a vehicle body, mating center plates on truck and body having surfaces facing each other and intersecting the axis of the center plates for transmission of at least a large part of the weight of said body to said truck, and a liner with its radial surfaces of grease- and water-resistant friction material, in the nature of automotive brake lining, interposed without lubricant between said surfaces of the center plates, said liner being stiff in circumferential direction to permit relative rotation of body and truck only in overcoming the friction between said liner and said center plates, such friction suppressing shimmy of the truck about the axis of the center plates.

ALBERT G. DEAN.

REFERENCES CITED

The following references are of record in the file of this patent:

UNITED STATES PATENTS

| Number | Name | Date |
|---|---|---|
| 1,775,249 | Lewis | Sept. 9, 1930 |
| 1,928,740 | Tatum | Oct. 3, 1933 |
| 2,229,925 | Jackson | Jan. 28, 1941 |

FOREIGN PATENTS

| Number | Country | Date |
|---|---|---|
| 404 of 1864 | Great Britain | Feb. 13, 1865 |
| 404 of 1865 | Great Britain | July 18, 1865 |
| 1,435 of 1873 | Great Britain | Apr. 21, 1873 |
| 110,321 | Australia | Apr. 18, 1940 |